Figure 2:
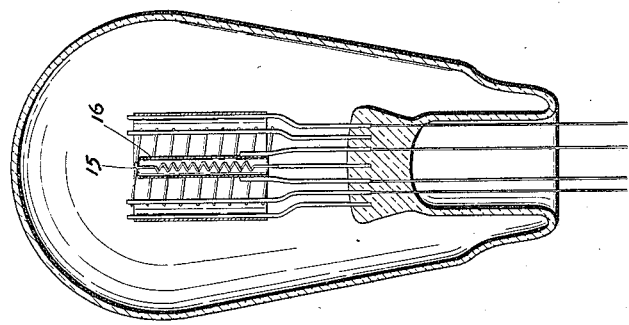

Sept. 24, 1935.                P. L. SPENCER                    2,015,325
                                VACUUM TUBE
                             Filed June 3, 1929

INVENTOR
PERCY L. SPENCER
BY
ATTORNEY

Patented Sept. 24, 1935

2,015,325

UNITED STATES PATENT OFFICE 2,015,325

VACUUM TUBE

Percy L. Spencer, Medford, Mass., assignor to Raytheon Production Corporation, Cambridge, Mass., a corporation of Delaware Application June 3, 1929, Serial No. 367,948

3 Claims. (Cl. 250—27.5)

This invention relates to vacuum tubes and particularly to cathodes and methods of manufacturing same. Vacuum tubes as a rule have the Wehnelt type of cathode consisting of a filament or cylinder whose surface has been treated in such a manner that oxides of alkaline earth metals are deposited thereon to promote emission of electrons when heated.

In the commercial manufacture of such cathodes, it is customary to use a barium carbonate mixed with calcium or strontium carbonate as the base from which the oxides are made. These carbonates are usually mixed with distilled water or a weak solution of barium nitrate to form a paste. If the cathode is of a filamentary type, the wire which may be of tungsten, platinum or nickel alloy, is generally run through a hydrogen furnace in order to clean and prepare its surface for the application of the paste. The paste is then applied and the coating filament run through a suitable furnace to dry it. Such a filament when mounted in the tube and heated will finally have a surface composed principally of the oxides of the alkaline earth metals and suitable for use in a vacuum tube. The preparation of equi-potential cathodes is generally similar.

In the course of manufacture of such cathodes, care must be taken that the chemicals used are pure and have not remained in the air for more than a period of a few hours. Furthermore, after the filament is coated, care must be exercised to see that the filament is mounted in the vacuum tube and the tube exhausted within a few hours of the coating. In the actual manufacture of a large number of such tubes, it happens that many of the filaments are more or less deleteriously affected by delays and their presence in the tube render the latter defective and useless.

An object of my invention is to improve the manufacture of such cathodes so that a more uniform product will be obtained. A further object is to make it possible to manufacture vacuum tube cathodes in such a manner that a greater latitude of time is permitted without resulting in the spoilage of any substantial number of tubes.

I have found that if silver in a finely divided form or in the form of an easily decomposable substance such as silver nitrate is added to the compounds used in coating that the resulting cathodes are much more uniform in quality and are in general superior as regards current emission. At present I am not prepared to state exactly what function the silver assumes. It is possible that the ease with which silver is oxidized and reduced has considerable to do with its action in stabilizing the coatings for cathodes. Since silver, either in its metallic form or in the form of an easily-decomposable substance, performs a stabilizing action, I intend that wherever I use the words "silver" or "silver stabilizing medium" in the specification or claims, either silver in its metallic form or in the form of an easily-decomposable substance shall be included in the scope of these terms.

In the case of a filament, I preferably mix the dry carbonates of strontium and barium in substantially equal proportions. To each one hundred grams of this mixture may be added about eight grams of metallic silver. This silver is preferably in a finely divided condition and should be able to go through a 200 mesh screen. In order to thoroughly mix these substances they may be put into a ball mill and ground up therein for a short period of time. To this mixture may be added a weak solution of barium nitrate in distilled water, making a smooth paste. As is well known in the art such a paste should be ground in a mortar in order to prevent the formation of any lumps. This paste should preferably be used shortly after the making thereof. The filament may be coated in the usual manner with this paste.

Instead of metallic silver the paste may be mixed with a solution of silver nitrate of sufficient strength and quantity to obtain about the same amount of silver as previously prescribed.

For manufacturing equi-potential cathodes where non-filamentary bodies are to be coated, it is preferable to mix up the dry ingredients as stated above and make a suspension in amylacetate or similar liquids. Such a suspension may be spread on the cathode or the cathode may be dipped therein.

Cathodes made in this manner may be incorporated in a vacuum tube with excellent results. It has been found that vacuum tubes having cathodes treated in this manner are more uniform and on the average have a greater space current output than is true of similar tubes omitting the silver.

The two figures in the drawing are sectional views of tubes provided with cathodes embodying my invention.

Figure 1:
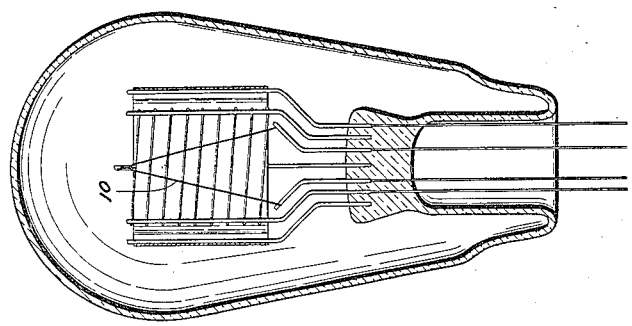

Figure 1 shows the usual tube having a hairpin filament 10. Figure 2 shows a similar tube having an equipotential cathode comprising a heating element 15 within a cylindrical member 16 whose outer surface has been treated in the manner specified.

I claim:

1. A cathode adapted to become electron-emitting having a coating which consists essentially of alkali earth metal carbonate and silver.

2. A cathode adapted to become electron-emitting having a coating which consists essentially of alkali earth metal carbonate and silver nitrate.

3. A cathode adapted to become electron-emitting having a coating which consists essentially of alkali earth metal carbonate and a silver stabilizing medium.

PERCY L. SPENCER.